United States Patent
Lees et al.

(10) Patent No.: US 10,739,935 B2
(45) Date of Patent: Aug. 11, 2020

(54) REVIEW OF PREVIOUSLY DISPLAYED CONTENT

(71) Applicant: INTERNATIONAL BUSINESS MACHINES CORPORATION, Armonk, NY (US)

(72) Inventors: Andrew Lees, Wimborne (GB); Alexandra Wishart, Eastleigh (GB); Adam Michael Farley, Eastleigh (GB); Keira L. Hopkins, Eastleigh (GB)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/193,097

(22) Filed: Nov. 16, 2018

(65) Prior Publication Data
US 2020/0159370 A1    May 21, 2020

(51) Int. Cl.
*G06F 3/0481* (2013.01)
*G06F 16/54* (2019.01)
*G06K 9/62* (2006.01)
*G06F 3/0482* (2013.01)

(52) U.S. Cl.
CPC .......... *G06F 3/0481* (2013.01); *G06F 3/0482* (2013.01); *G06F 16/54* (2019.01); *G06K 9/6215* (2013.01); *G06K 2209/01* (2013.01)

(58) Field of Classification Search
CPC ...... G06F 3/0481; G06F 3/0482; G06F 16/54; G06K 9/6215; G06K 2209/01
See application file for complete search history.

(56) References Cited

U.S. PATENT DOCUMENTS

| 9,183,752 B2 | 11/2015 | Nickell et al. |
| 9,282,289 B2 | 3/2016 | Alexandrov et al. |
| 2004/0041830 A1 | 3/2004 | Chiang et al. |
| 2005/0203882 A1 | 9/2005 | Godley |
| 2012/0144286 A1* | 6/2012 | Bank ..................... G06F 17/241 715/230 |
| 2012/0262361 A1* | 10/2012 | Kitagawa .............. G06F 3/1454 345/2.2 |

(Continued)

OTHER PUBLICATIONS

IBM, "Capturing Windowing States via Snapshots", An IP.com Prior Art Database Technical Disclosure, IPCOM000071091D, Feb. 21, 2005, pp. 1-2.

(Continued)

*Primary Examiner* — Daniel Samwel
(74) *Attorney, Agent, or Firm* — Richard A. Wilhelm (57) ABSTRACT

A method for reviewing content previously displayed on a display screen includes capturing at least one screenshot of at least part of a display screen in response to an occurrence of a trigger event based on a change in displayed content. A value of at least one criterion of the displayed content is stored in association with each captured screenshot. A request is received, based on at least one of the stored criteria, to review a captured screenshot. A screenshot corresponding with the request may be superimposed on the display screen as an overlay. Content displayed on the screen for the occurrence of the trigger event is monitored. A screenshot in response to each occurrence of the trigger event is captured. The request to review a screenshot may be a request to review a selection from a plurality of captured screenshots.

16 Claims, 6 Drawing Sheets

(56) References Cited

U.S. PATENT DOCUMENTS

| | | | |
|---|---|---|---|
| 2014/0325409 A1* | 10/2014 | Geva | G06F 9/451 |
| | | | 715/765 |
| 2017/0277625 A1* | 9/2017 | Shtuchkin | G06F 11/3688 |
| 2018/0068540 A1* | 3/2018 | Romanenko | G06K 9/3233 |
| 2018/0129657 A1* | 5/2018 | Guest | G06F 3/04842 |
| 2018/0181286 A1* | 6/2018 | McKay | G06F 3/04845 |

OTHER PUBLICATIONS

Wu et al., "Providing Content-Related Snapshots for Current Sharing", IPCOM000235676D, Mar. 19, 2014, pp. 1-8.

* cited by examiner

REVIEW OF PREVIOUSLY DISPLAYED CONTENT

FIELD

Embodiments of the present invention relate generally to reviewing screen content, and more particularly to reviewing content stored from screens that have previously been displayed.

BACKGROUND

Computer systems display content that may be viewed on a display screen. When an immovable menu or pop-up that appears in a program covers a portion of the screen containing useful information, the useful information is hidden. When text or an image being displayed is changed by a user, the changed text or image is replaces the previously displayed image. When web browsing, when a user visits a new webpage, a previously viewed webpage may be closed or hidden. The previously viewed webpage is replaced with a display of the new webpage.

SUMMARY

According to some embodiments, a computer-implemented method for reviewing content previously displayed on a display screen includes capturing at least one screenshot of at least part of the display screen in response to an occurrence of a trigger event based on a change in the displayed content. The method also includes storing, in association with the captured screenshot or each captured screenshot, a value of at least one criterion of the displayed content. The method may include receiving a request, based on at least one of the stored criteria, to review a captured screenshot, and overlaying on the screen display the requested screenshot.

Other embodiments are directed to a computer program product for reviewing content previously displayed on a display screen. Additional embodiments are directed to a computer system for reviewing content previously displayed on a display screen.

BRIEF DESCRIPTION OF THE SEVERAL VIEWS OF THE DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

DETAILED DESCRIPTION

Some embodiments will be described in more detail with reference to the accompanying drawings, in which the embodiments of the present disclosure have been illustrated. However, the present disclosure can be implemented in various manners, and thus should not be construed to be limited to the embodiments disclosed herein.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

It should be understood that the Figures are merely schematic and are not drawn to scale. It should also be understood that the same reference numerals are used throughout the Figures to indicate the same or similar parts.

In the context of the present application, where embodiments of the present invention constitute a method, it should be understood that such a method may be a process for execution by a computer, i.e. may be a computer-implementable method. The various steps of the method may therefore reflect various parts of a computer program, e.g. various parts of one or more algorithms.

Also, in the context of the present application, a system may be a single device or a collection of distributed devices that are adapted to execute one or more embodiments of the methods of the present invention. For instance, a system may be a personal computer (PC), a server or a collection of PCs and/or servers connected via a network such as a local area network, the Internet and so on to cooperatively execute at least one embodiment of the methods of the present invention.

There are many situations in which the user of a computer system, viewing its display screen, wishes to review content that has been displayed but is no longer being shown. This review may need to be done whilst still working on the computer system, to obtain information that is no longer visible.

One example is when an immovable menu or pop-up that appears in a program covers a portion of the screen containing the useful information. To obtain that information it is necessary to close temporarily the menu or pop-up, obtain the information and then reopen the menu or pop-up.

Another example is when text or an image being viewed is changed. There is no easy way of viewing old versions of the text or image. It is necessary for example to undo and redo the changes, or to switch to a new branch on Git (a version control system used with Linux) and compare code, or to bring up two menus to look between them.

When web browsing, it often becomes necessary to view information from a webpage that the user has closed, by reloading that whole webpage and finding the information again. When the viewer wishes to look at a previous element of a webpage, the browser's "Back" command may take the viewer back to a different Uniform Resource Locator (URL), making it hard to locate the necessary content again.

Sometimes a viewer may want to show somebody else the steps that have been taken to achieve a particular task, by recreating the actions taken.

Proposed is a concept for enabling a user of a computer system to review content that has been displayed on a screen, e.g. in a browsing session, to obtain information no longer displayed. Successive screenshots, partial or full screen, may be taken automatically in response to each occurrence of a predetermined trigger event, e.g. based on significant changes in pixel intensity over an area. Values of at least one criterion of the displayed content, such as the location on the screen and the time at which the changes occurred, or the topic, associated program, date or content type, may be stored with the screenshots. The user can then select from captured screenshots, based on the stored criteria, and have them displayed as an overlay.

A computer-implemented method embodying the invention for reviewing content that has been displayed on a screen may comprise capturing at least one screenshot of at least part of a displayed screen, in response to an occurrence of a trigger event based on a change in the displayed content. The method may then comprise storing, in association with the captured screenshot or each captured screenshot, a value of at least one criterion of the displayed content. It may then comprise receiving a request, based on at least one of the stored criteria, from a viewer of the screen to review a captured screenshot, and overlaying on the screen display the requested screenshot. In an embodiment, the trigger event may be predetermined. In an embodiment, the criterion may be predetermined.

The method may comprise monitoring the content displayed on the screen for the occurrence of the trigger event and capturing a screenshot in response to each occurrence of the trigger event. This monitoring process may be automatic, i.e. without user input, and it may occur over part of, or the whole of, a session of use of the system, such as a browsing session or a period of creation of a document, spreadsheet, set of slides or program. A number of different applications may, of course, be used during such a session and may be used concurrently, displaying different windows. In the example of there being a succession of screenshots, rather than just one, the request from the viewer of the screen to review a screenshot may be a request to review a selection from the captured screenshots, the selection based on the stored values of at least one of the criteria.

Where for example a pop-up obscures part of a screen containing useful information, the invention could copy the obscured portion as a stored screenshot, since there will have been a change in the screen display at that part of the screen, and could overlay that on the pop-up, upon request from the viewer.

Where a viewer browsing the Internet needs to obtain data that he or she remembers has been previously displayed earlier in the browsing session, he or she can request that it be overlaid on the current screen. The viewer can identify the required content in many different ways based on a criterion such as where the content previously appeared on the screen, or the time of day at which it appeared, or the type of subject-matter of the content.

Thus, in an embodiment, the criterion or criteria of the displayed content may comprise at least one of: the position on the screen at which the changes in the displayed content occurred; the time at which the changes in the displayed content occurred; and a parameter related to the displayed content. This parameter may, for example, be a topic relevant to the content of the displayed screen, an associated program that generates the screen, the date of the content, or the content type such as text, image or video, or detailed type such as a Uniform Resource Locator (URL) or a bibliographic reference.

In an example, the criterion or one of the criteria of the displayed content may comprise the position on the screen at which the changes in the displayed content occurred; and the receiving of the request from a viewer of the screen may comprise receiving an indication of the location on the screen as the selection of screenshots for which the position at which changes occurred overlaps with that location. The position on the screen may for example be defined by ranges in two position coordinates, which could define a rectangular region. It may alternatively comprise polar coordinates. The position may be a region of any appropriate size or shape.

The trigger event may be based on pixel changes in the screen display. For example, the average intensity of pixels over a given area, or over multiple areas, may be compared from one screen to the next, and the change may be monitored by comparing the amount of change with a threshold. The trigger event may then be the detection of a change greater than the threshold. In an embodiment, the threshold may be predetermined.

The method may comprise capturing successive full screens and video processing the captured full screens to identify differences between them, wherein the trigger event is based on those differences.

In any of the above-described examples, the method may comprise receiving an input from the viewer of the screen indicative of a threshold level of the amount of change in the displayed screens, and using that threshold level to determine the occurrence of the predetermined trigger event. This gives the user the flexibility of setting the sensitivity and thus the number of screenshots that are captured.

It will be understood that many computer applications generate windows, one or more of which may be moved across the screen e.g. in response to the user dragging the window with a mouse. The method may then comprise tracking the motion of a window as at least part of the displayed screen, and the capturing of a screenshot may then comprise capturing screenshots at the start and end points of the motion of the window. This can avoid unnecessary capture of intermediate screenshots.

One of the criteria of the displayed content may comprise the time at which the changes in the displayed screen occurred. This time may, for example, be the time of day, e.g. in hours, minutes and seconds of the clock; or the time of day combined with the date; or just the date. The step of storing may then comprise storing, for each captured screenshot, the time at which the changes in the displayed content occurred in association with the captured screenshot and the position on the screen. In such an example, there are at least two criteria—the time and the screen position—whose values are stored to assist in subsequent user selection for review.

Typically, there will be a plurality of screenshots captured and stored. In an embodiment, the method may comprise receiving an input from the viewer of the screen indicative of one screenshot from among the plurality of selected captured screenshots and overlaying on the screen display at least the one screenshot. Thus, one criterion may be used for the initial selection of screenshots from all the stored screenshots that have been captured; and then a sub-selection e.g. of just one screenshot may be made by the user from that selection. The criterion used for the sub-selection may be different from the criterion used for the initial selection. For example, the initial selection may be based on the screen position—the user may wish for example to find content that has been displayed in, or close to, a particular part of the screen. Then, the selection of screenshots satisfying that positional criterion may be displayed for sub-selection by user input. This sub-selection may be made based on the time of display, for example, by scrolling through sequential screenshots and sub-selecting one.

The system may be programmed to overlay the selected screenshot or screenshots at any specified location on the screen, if they are not of the full screen. This location may be predetermined as the original stored position of the screenshot.

It will be understood that in some examples the system may provide the user with the option to enlarge or reduce the size of the screenshots for overlay, based on the visibility of the required content being reviewed, and the available screen area taking account of what needs to remain in view in the current screen.

In any of the examples described, the capturing of a screenshot may be of the full screen as displayed, and the method may comprise receiving an input from the viewer of the screen indicative of a selection of full screen or partial screen display of screenshots. The method may then comprise overlaying on the screen display, in accordance with the viewer selection, the at least one identified screenshot as one of: a full screen; and a partial screen, the method comprising generating the partial screen from the full screen based on the location on the screen at which changes in the displayed image occurred. In other words, the whole screen may be captured in case the viewer may wish to view any part of it, but the user has the option of seeing as an overlay only the part that is useful. This option may be set as a default option.

For the sub-selection described above, the method may comprise receiving an input from the viewer of the screen indicative of a selection (the sub-selection) of one screenshot from among plural captured screenshots for which the position at which changes occurred overlaps with the selected location on the screen, and overlaying on the screen display at least the selected one screenshot at the selected location. The receiving of an input from the viewer of the screen indicative of the location on the screen and of the selection from among plural captured screenshots may comprise receiving as a location pointer and as a scrolling position an output from a viewer interface. This interface could be a typical pointer device which may have a scroll function, but there could alternatively be a user interface forming part of the screen display, and the selection could then be made by pointing or moving or dragging, using a pointing device or using a touchscreen function.

To assist the user in obtaining the information required as part of the review, the method may comprise OCR processing the selected screenshot to generate text. This may for example include particular types of information, such as telephone numbers and URL. The text may then be copied for use in a current application, for example in data entry on a current screen or for the selection of a URL to browse next.

In an embodiment, a computer-implemented method of browsing a web to generate and display a sequence of screens may comprise reviewing the web browsing screens using any of the methods described above.

In another embodiment, a computer system having a display screen, a viewer interface, a processor and a memory, may have its processor programmed to review content that has been displayed on the display screen, by capturing at least one screenshot of at least part of a displayed screen, in response to an occurrence of a predetermined trigger event based on a change in the displayed content. It may store in the memory, in association with the captured screenshot or each captured screenshot, a value of at least one predetermined criterion of the displayed content. It may receive, through the viewer interface, a request, based on at least one of the stored criteria, from a viewer of the screen to review a captured screenshot, and may then overlay on the screen display the requested screenshot.

The processor of this system may be programmed to monitor the content displayed on the screen for the occurrence of the predetermined trigger event and to capture a screenshot in response to each occurrence of the trigger event. The request from the viewer of the screen to review a screenshot may be a request to review a selection from the captured screenshots, the selection based on the stored values of at least one of the criteria.

In an embodiment, the criterion or criteria of the displayed content may comprise the position on the screen at which the changes in the displayed content occurred. Alternatively, or in addition, the criterion or criteria may comprise the time at which the changes in the displayed content occurred; and/or a parameter related to the displayed content. This parameter may for example be a topic relevant to the content of the displayed screen, an associated program that generates the screen, the date of the content, or the content type such as text, image or video, or detailed type such as a URL or a bibliographic reference.

In an embodiment, the criterion or one of the criteria of the displayed content may comprise the position on the screen at which the changes in the displayed content occurred. The receiving of the request from a viewer of the screen may comprise receiving an indication of the location on the screen as the selection of screenshots for which the position at which changes occurred overlaps with that location.

In this example, the processor may be programmed to receive an input from the viewer of the screen indicative of a selection of one screenshot from among plural captured screenshots for which the position at which changes occurred overlaps with the selected location on the screen and to overlay on the screen display at least the selected one screenshot at the selected location. The receiving of an input from the viewer of the screen indicative of the location on the screen and of the selection from among plural captured screenshots may comprise receiving as a location pointer and as a scrolling position an output from the viewer interface.

Proposed embodiments may therefore provide methods and systems for capturing screenshots and selecting for overlay on a current screen a screenshot that contains useful information for the user. The screenshots may be associated in storage with a particular criterion such as the time and/or the screen position at which a significant change occurred e.g. in average pixel intensity, or associated with some other parameter such as the URL of the webpage being displayed, or the type of image content being displayed. The user then may request the overlay, and may select a captured screenshot to be overlaid based on a value or range of values of the criterion. Multiple screenshots may be found that satisfy one criterion, such as the location, and the user may then make a sub-selection, e.g. by using an interface such as a mouse or a menu touchscreen function. This enables the user to locate the information required as quickly as possible and without interrupting the application currently running or interfering significantly with the current screen display.

In some examples, only one screenshot may be captured. The invention may enable the viewer to request that a screenshot is overlaid, provided the value of the criterion stored in association with the screenshot satisfies a predetermined condition. For example, the system may be configured to provide an overlaid screenshot only if it was created at a time that is sufficiently recent to be relevant to the viewer—if the only screenshot that has been stored fails to satisfy that condition, then it is not overlaid. The system may then provide an indication to the viewer that no screenshot is currently suitable.

It will be appreciated that the invention may be used in conjunction with existing computer systems and methods e.g. for running applications and browsing the Web. The overlaying of the screenshot may be performed using conventional techniques including rendering the full screen or partial screen image and combining that with a current screen.

Figure 1:
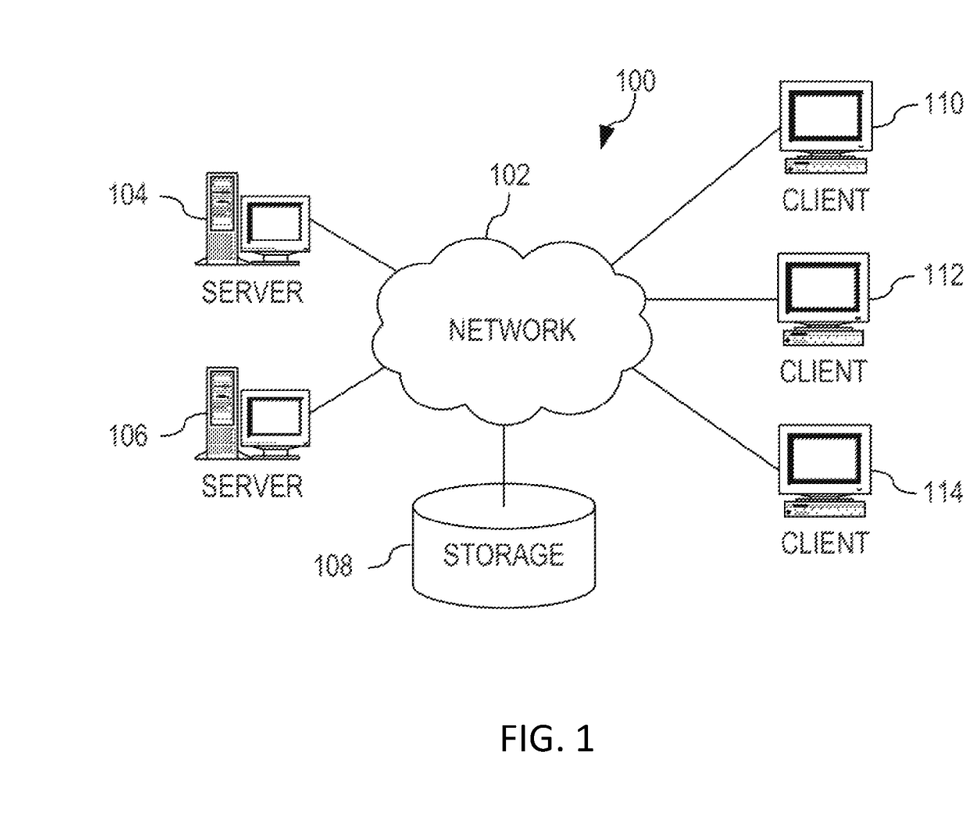
FIG. 1 depicts a pictorial representation of an example distributed system in which aspects of the illustrative embodiments may be implemented.

FIG. 1 depicts a pictorial representation of an exemplary distributed system in which aspects of the illustrative embodiments may be implemented. Distributed system 100 may include a network of computers in which aspects of the illustrative embodiments may be implemented. The distributed system 100 contains at least one network 102, which is the medium used to provide communication links between various devices and computers connected together within the distributed data processing system 100. The network 102 may include connections, such as wire, wireless communication links, or fiber optic cables.

In the depicted example, a first 104 and second 106 servers are connected to the network 102 along with a storage unit 108. In addition, clients 110, 112, and 114 are also connected to the network 102. The clients 110, 112, and 114 may be, for example, personal computers, network computers, or the like. In the depicted example, the first server 104 provides data, such as boot files, operating system images, and applications to the clients 110, 112, and 114. Clients 110, 112, and 114 are clients to the first server 104 in the depicted example. The distributed processing system 100 may include additional servers, clients, and other devices not shown.

In the depicted example, the distributed system 100 is the Internet with the network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the present invention, and therefore, the particular elements shown in FIG. 1 should not be considered limiting with regard to the environments in which the illustrative embodiments of the present invention may be implemented.

Figure 2:
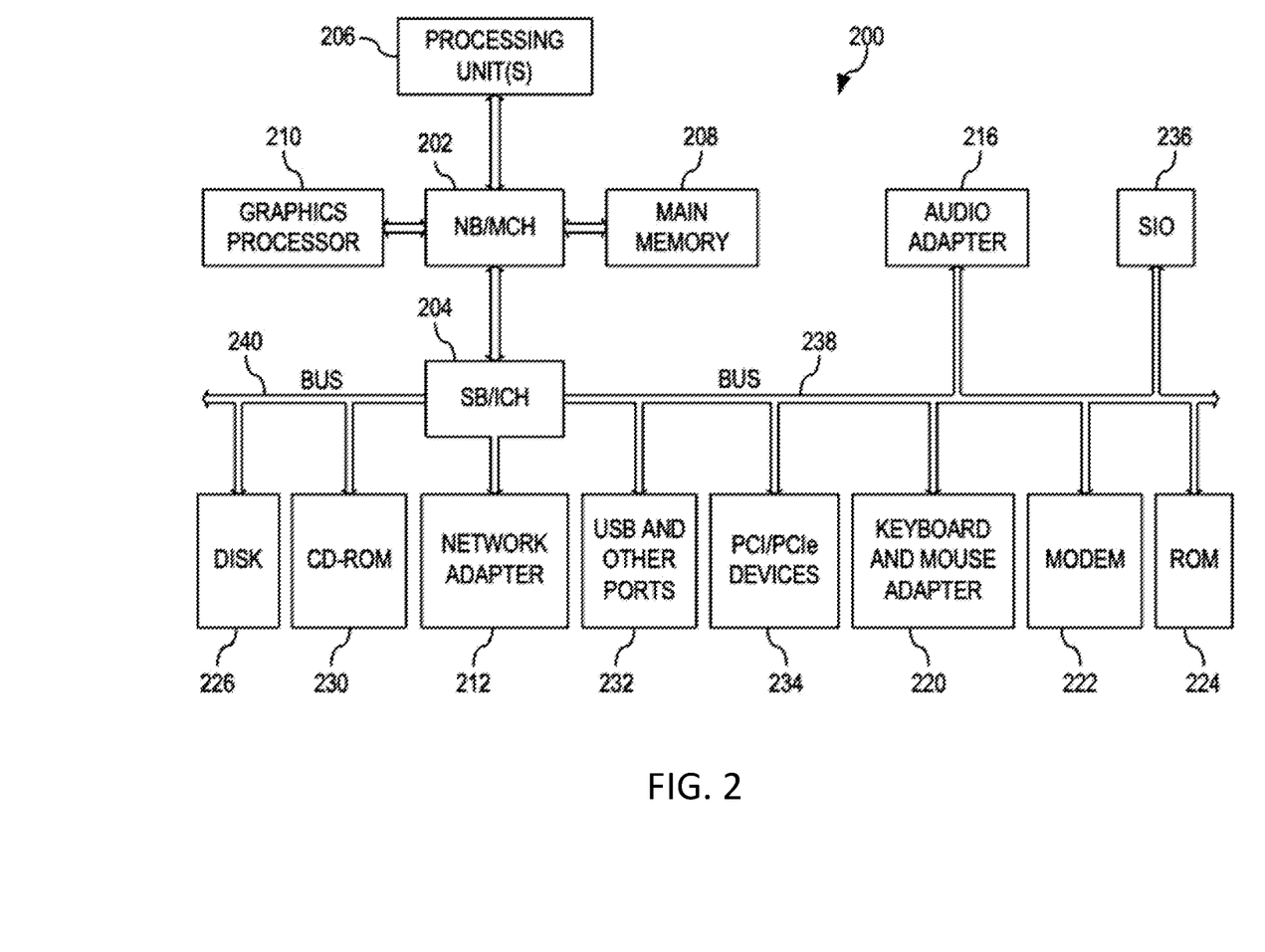
FIG. 2 is a block diagram of an example system in which aspects of the illustrative embodiments may be implemented.

FIG. 2 is a block diagram of an example system 200 in which aspects of the illustrative embodiments may be implemented. The system 200 is an example of a computer, such as client 110 in FIG. 1, in which computer usable code or instructions implementing the processes for illustrative embodiments of the present invention may be located.

In the depicted example, the system 200 employs a hub architecture including a north bridge and memory controller hub (NB/MCH) 202 and a south bridge and input/output (I/O) controller hub (SB/ICH) 204. A processing unit 206, a main memory 208, and a graphics processor 210 are connected to NB/MCH 202. The graphics processor 210 may be connected to the NB/MCH 202 through an accelerated graphics port (AGP).

In the depicted example, a local area network (LAN) adapter 212 connects to SB/ICH 204. An audio adapter 216, a keyboard and a mouse adapter 220, a modem 222, a read only memory (ROM) 224, a hard disk drive (HDD) 226, a CD-ROM drive 230, a universal serial bus (USB) ports and other communication ports 232, and PCI/PCIe devices 234 connect to the SB/ICH 204 through first bus 238 and second bus 240. PCI/PCIe devices may include, for example, Ethernet adapters, add-in cards, and PC cards for notebook computers. PCI uses a card bus controller, while PCIe does not. ROM 224 may be, for example, a flash basic input/output system (BIOS).

The HDD 226 and CD-ROM drive 230 connect to the SB/ICH 204 through second bus 240. The HDD 226 and CD-ROM drive 230 may use, for example, an integrated drive electronics (IDE) or a serial advanced technology attachment (SATA) interface. Super I/O (SIO) device 236 may be connected to SB/ICH 204.

An operating system runs on the processing unit 206. The operating system coordinates and provides control of various components within the system 200 in FIG. 2. As a client, the operating system may be a commercially available operating system. An object-oriented programming system, such as the Java™ programming system, may run in conjunction with the operating system and provides calls to the operating system from Java™ programs or applications executing on system 200.

As a server, system 200 may be, for example, an IBM® eServer™ System p® computer system, running the Advanced Interactive Executive (AIX®) operating system or the LINUX® operating system. The system 200 may be a symmetric multiprocessor (SMP) system including a plurality of processors in processing unit 206. Alternatively, a single processor system may be employed.

Instructions for the operating system, the programming system, and applications or programs are located on storage devices, such as HDD 226, and may be loaded into main memory 208 for execution by processing unit 206. Similarly, one or more message processing programs according to an embodiment may be adapted to be stored by the storage devices and/or the main memory 208.

The processes for illustrative embodiments of the present invention may be performed by processing unit 206 using computer usable program code, which may be located in a memory such as, for example, main memory 208, ROM 224, or in one or more peripheral devices 226 and 230.

A bus system, such as first bus 238 or second bus 240 as shown in FIG. 2, may comprise one or more buses. Of course, the bus system may be implemented using any type of communication fabric or architecture that provides for a transfer of data between different components or devices attached to the fabric or architecture. A communication unit, such as the modem 222 or the network adapter 212 of FIG. 2, may include one or more devices used to transmit and receive data. A memory may be, for example, main memory 208, ROM 224, or a cache such as found in NB/MCH 202 in FIG. 2.

Those of ordinary skill in the art will appreciate that the hardware in FIGS. 1 and 2 may vary depending on the implementation. Other internal hardware or peripheral devices, such as flash memory, equivalent non-volatile memory, or optical disk drives and the like, may be used in addition to or in place of the hardware depicted in FIGS. 1 and 2. Also, the processes of the illustrative embodiments may be applied to a multiprocessor data processing system, other than the system mentioned previously, without departing from the spirit and scope of the present invention.

Moreover, the system 200 may take the form of any of a number of different data processing systems including client computing devices, server computing devices, a tablet computer, laptop computer, telephone or other communication device, a personal digital assistant (PDA), or the like. In some illustrative examples, the system 200 may be a portable computing device that is configured with flash memory to provide non-volatile memory for storing operating system files and/or user-generated data, for example. Thus, the system 200 may essentially be any known or later-developed data processing system without architectural limitation.

Figure 3:
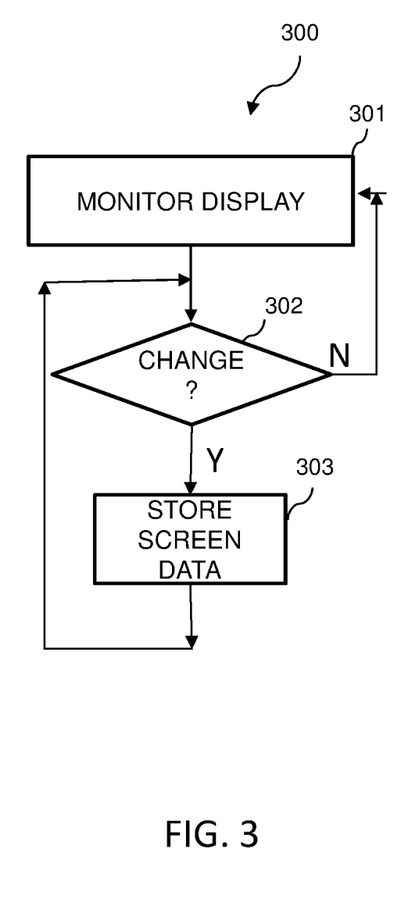
FIG. 3 is a simplified flow diagram of a process of storing screenshots performed according to an embodiment.
Figure 4:
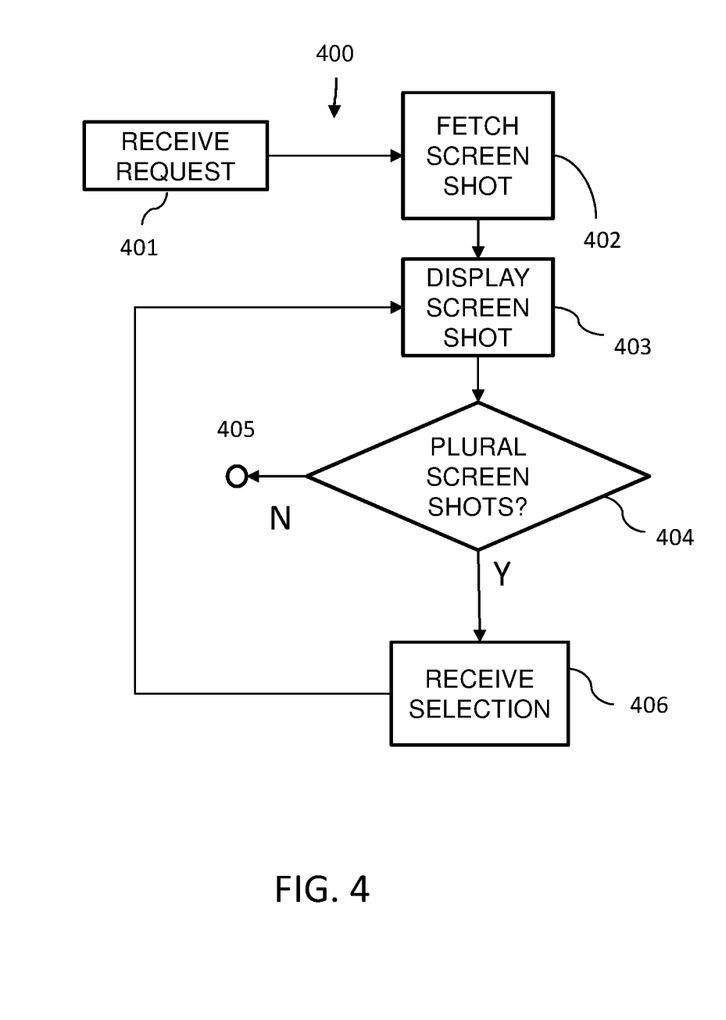
FIG. 4 is a simplified flow diagram of a process for reviewing screenshots according to the embodiment of FIG. 3.

FIGS. 3 and 4 are flow diagrams of processes, as examples of the invention, that may be carried out in a computer system embodying the invention described below with reference to FIG. 5. During normal use of a computer (which may be a personal computer and may be a desktop or a portable device such as a laptop or tablet or even a mobile phone), a viewer uses applications and views successive screens displayed on a monitor. These screens are generated from screen content output from an application within the computer, the computer having systems which format and render the content for display on the monitor. The screens contain multiple pixels which may be colored.

FIG. 3 depicts a process 300 which is executed by the computer for storing screenshots. At the beginning of a viewing session, the process begins at step 301 by starting a process of monitoring the screens that are currently displayed on a monitor. The system compares the content of successive screens to detect whether there is a change. This detection of change is shown in step 302. If there is no change detected from the last screen, then the process returns to the monitoring step 301. However, if a change is detected, the process continues to step 303 at which the system stores a value of a criterion of the screen, and also captures and stores a screenshot of that screen, i.e. a full image of the screen content as a frame.

The monitoring of step 301 monitors the changes of pixels. This may be done by any appropriate known systems for detecting changes, such as by averaging the pixel intensity over different portions of the screen area and detecting whether the average changes by more than a predetermined amount, as a threshold intensity. The detection may also use changes in color of the pixels. An example of software for detecting pixels in one screen that match pixels in another screen may be found in AutoHotkey, an open-source scripting language for Windows that allows users to create scripts for tasks such as form filling and macros. It includes processes of searching for pixels in rectangles that satisfy certain criteria.

AutoHotkey includes a pixel search function for searching for regions of a screen that have pixels of a certain color, and a description of this software may be located at https://www.autohotkey.com/docs/commands/PixelSearch.htm.

Alternatively, the monitoring step 301 may comprise capturing full screens as a video sequence and then processing the video to detect changes indirectly. An example of software that does this may be found in International Journal of Information & Computation Technology. ISSN 0974-2239 Volume 4, Number 15 (2014), pp. 1559-1565, and at www.irphouse.com.

The level of the difference required to trigger a screenshot being taken may be adjusted as required. For example, according to one embodiment, moving a mouse or typing from a keyboard should not trigger a screenshot, but deleting a chunk of text or closing a window should. The criteria for triggering a screenshot may be stored within the computer as user preferences, with predetermined default values that are suitable for most viewers.

The process may also include receiving an input from the viewer of the screen indicative of a threshold level of the amount of change in the displayed screens, and using that threshold level to determine the occurrence of the predetermined trigger event.

Motion tracking may be used to determine if something such as a window is being moved over the screen. For example, a user may drag a window across a screen. In this case, a screenshot need only be taken at start and end points of the motion, rather than taking a constant stream of screenshots during the motion.

In this embodiment, the system takes a screenshot of only the area of the screen where the change occurred. In step 303, the system stores the screenshot, which may be a frame containing the content of only that area, together with the time at which the change occurred (taken e.g. from the computer clock) and the position on the screen of the changed area. The position of the changed area may for example be defined by the start and end coordinates in each of two dimensions, to define a rectangle; but other criteria may be used, such as polar coordinates, or by a list of predetermined and labelled small areas of the screen. One record of position may for example be: "screen 1, X=20=150, y=50=80, time=10067." This record of the position may then be used to recreate the screenshot at the same screen position when required, as described below.

In another embodiment, the method comprises receiving an input from the viewer of the screen indicative of a selection of full screen or partial screen display of screenshots. The method then comprises overlaying on the screen display, in accordance with the viewer selection, at least one identified screenshot a full screen or as a partial screen. In order that the full screen may be available in captured screenshots, even when only part of the screen may have undergone a significant change, the method may comprise storing the whole screen in the screenshots, coupled with the identification of the position of the area that changed and triggered the capturing. The method may then comprise generating the partial screen from the stored full screen based on the location on the screen at which changes in the displayed image occurred, and displaying that partial screen.

Screen shots may be saved as frames so that the depth (in a sequence of frames) may be determined by the time it was taken, and the position and size may be determined by the position and size when it was taken.

FIG. 4 shows an exemplary process 400 performed by the same system for reviewing screenshots according to an embodiment.

In step 401, the system detects a request made by the viewer to review an earlier screen. This request may be made for example by the viewer pressing a key on the keyboard, or clicking with a mouse on an icon displayed on the screen, or by a voice command.

In step 402, the system accesses the stored screenshot or screenshots, for example all those that have been captured in the current viewing session. In this embodiment, the system displays the most recent screenshot on the screen, in step 403. The screenshot is overlaid on the currently viewed screen. In this embodiment, it may be positioned at the same location on the screen as the location at which it was captured, which location has been stored in association with the screenshot. It may completely obscure the portion of the screen being viewed, or it may be partially transparent so that the current screen remains visible.

Step 401 may include the viewer selecting from stored screenshots by indicating the screen position. This may be based on the viewer's memory of where the required content was previously displayed. This may be indicated for example by the viewer clicking with a mouse or other pointing device at a screen location, or by touching the screen location. In this example, the step 402 of accessing the stored screenshots comprises searching only for those screenshots that overlap with the required location.

It will be appreciated that the location of a screenshot is just one possible criterion amongst many that could be used to select from stored screenshots. Other criteria include the time, which will have been stored for each screenshot, or an interval; this may be down to seconds, minutes, hours or even dates and times. Other criteria could even be the nature of the content being displayed—such as types of image being of people or buildings; or types of image being still or video. In the example of browsing the World Wide Web on the Internet, or browsing content in a LAN, the criteria could comprise the URL of the page being viewed, or the type of content which may be obtained for example from metadata.

The system may be able to access only one screenshot, or plural screenshots, satisfying the criteria. In this embodiment, the system performs step 404 which determines whether there is more than one screenshot that has been accessed and that is available for review. If there is only one, then no further screenshot needs to be displayed, and the method ends at step 405. However, if there is more than one, the system proceeds to step 406 to obtain a sub-selection of a screenshot from the viewer. The viewer may then navigate the plural screenshots by again selecting a point on the screen to more closely define the area of interest; and/or by scrolling, using a mouse or other tracking device, or by touching a menu on the screen, to move through the screenshots and to select one of them.

As described above, the viewer may make a selection and then a sub-selection. This however is not essential—the viewer may simply make a selection from all available screenshots that have been captured, in one step, using the criterion, such as location or time, for selection.

Once the required screenshot has been displayed as an overlay, in step 403, the viewer may review its content. The viewer may use the content directly, e.g. by memorizing part of it, writing it down, or cutting and pasting onto the current screen or another window. The system may include an OCR (optical character recognition) processor, and the system may process the screenshot using OCR to generate text to be copied. For example this text could be a telephone number or a url. Once the viewer has obtained the required information and the review is completed, the screenshot may be removed as an overlay, restoring the current screen in full.

Figure 5:
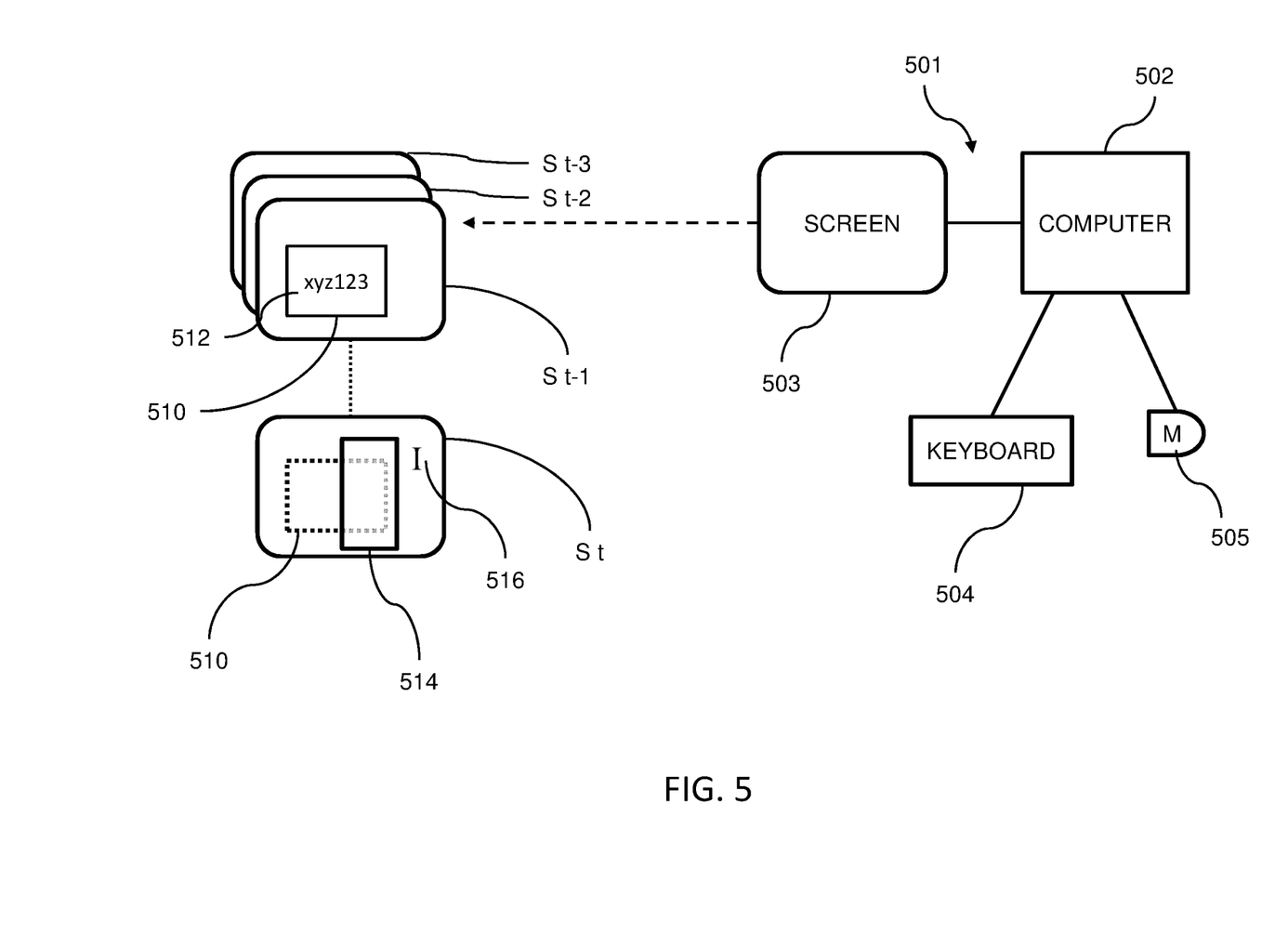
FIG. 5 is a simplified diagram of a computer system and its screen displays according to the embodiment of FIGS. 3 and 4.

The system 501 of an embodiment is shown in FIG. 5 by way of example only.

A personal computer 502 has a monitor screen (also referred to as a "display screen") 503 which displays successive screens S denoted by way of example as a sequence S t-3, S t-2, S t-1 and S, in which S t is the current screen. A viewer has a keyboard 504 and mouse 505 for controlling the system, including selecting options for reviewing screens.

In an example, the screen S t-1 shown at time t-1 displays content comprising text "xyz123" labelled 512, as part of a screen area 510 which in this example is rectangular. The next screen that is displayed is screen S t, which includes new content in a rectangular area 514, and no longer displays the area 510. The system detects that there has been a change in the pixels of the screen display, and in particular the system identifies that there has been a change at the area 510. The system, in this example, ignores change caused by new portions of the screen such as the rectangle 514, since this will not yet potentially be required for review—it will only become of interest for possible review if it disappears or changes. The system compares the level of change with a predetermined threshold and the outcome of this comparison, being positive, causes it to capture a screenshot of the area 510, coupled with the coordinates to identify the position of the area 510 and the time of the change.

Similar screenshots will have been captured from previous changes in screen content, and stored for possible review.

The system then detects a request from the viewer for a review of content that has been seen but is no longer visible. Using the process described above with reference to FIG. 4, the system may detect the required position for screenshots to overlap with, as the position of a pointer 516 moved by the viewer over the current screen S t. The system then overlays the required screenshot at position 510, its original position in the earlier screen S t-1. This will overlay the new content in area 514, in part, in this example. In the example that multiple screenshots are accessible, the viewer may select from them using the input devices 504 and 505, e.g. by scrolling through them until the required content is found.

It will be understood that the system may select screenshots in many different ways, based wholly or in part on user input, and on various criteria. An initial selection may be made automatically, for example of the most recent N screenshots; and then the viewer may make a sub-selection from those. The most recent screenshot may be overlaid automatically once the viewer has indicated that a review is requested; or the overlay may be delayed until the selection has been made. The selection may be made from a menu of thumbnails of screenshots presented as overlays on the current screen.

Figure 6:
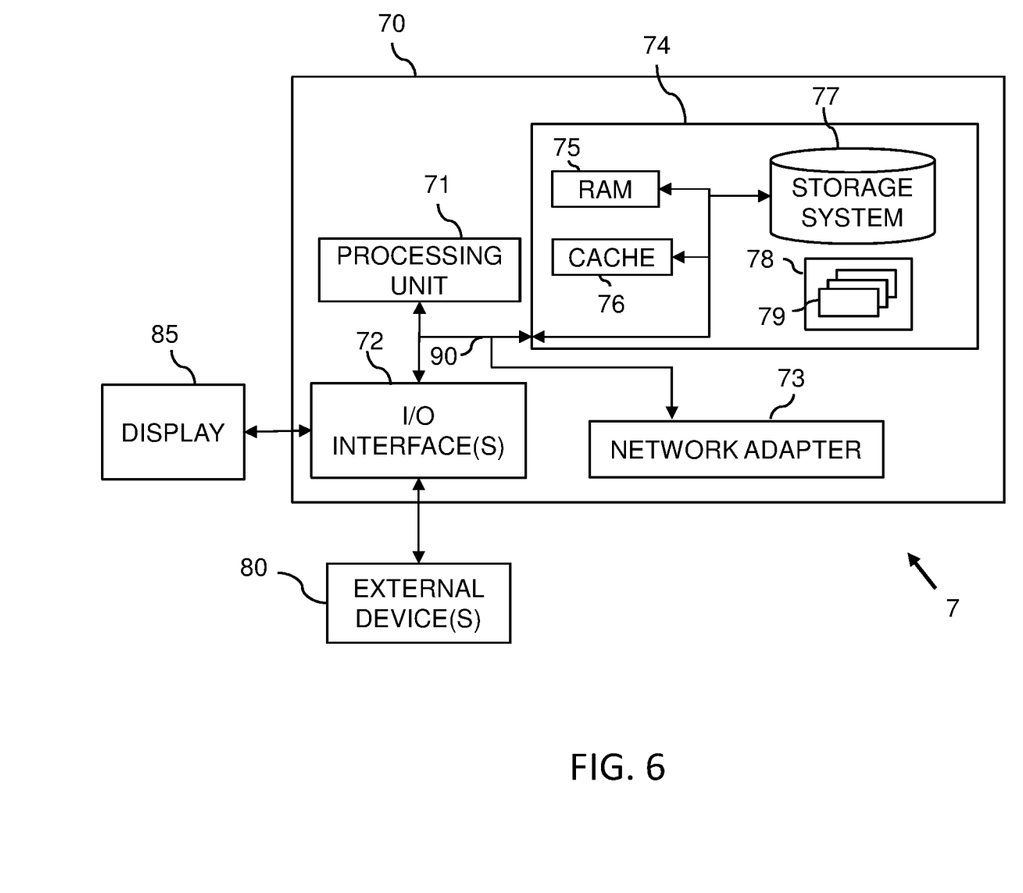
FIG. 6 illustrates a computer system according to an embodiment.

By way of further example, as illustrated in FIG. 6, embodiments may comprise a computer system 70, which may form part of a networked system 7. The components of computer system/server 70 may include, but are not limited to, one or more processing arrangements, for example comprising processors or processing units 71, a system memory 74, and a bus 90 that couples various system components including system memory 74 to processing unit 71.

Bus 90 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 70 typically includes a variety of computer system readable media. Such media may be any available media that is accessible by computer system/server 70, and it includes both volatile and non-volatile media, removable and non-removable media.

System memory 74 can include computer system readable media in the form of volatile memory, such as random access memory (RAM) 75 and/or cache memory 76. Computer system/server 70 may further include other removable/non-removable, volatile/non-volatile computer system storage media. By way of example only, storage system 74 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 90 by one or more data media interfaces. As will be further depicted and described below, memory 74 may include at least one program product having a set (e.g., at least one) of program modules that are configured to carry out the functions of embodiments of the invention.

Program/utility 78, having a set (at least one) of program modules 79, may be stored in memory 74 by way of example, and not limitation, as well as an operating system, one or more application programs, other program modules, and program data. Each of the operating system, one or more application programs, other program modules, and program data or some combination thereof, may include an implementation of a networking environment. Program modules 79 generally carry out the functions and/or methodologies of embodiments of the invention as described herein.

Computer system/server 70 may also communicate with one or more external devices 80 such as a keyboard, a pointing device, a display 85, etc.; one or more devices that enable a user to interact with computer system/server 70; and/or any devices (e.g., network card, modem, etc.) that enable computer system/server 70 to communicate with one or more other computing devices. Such communication can occur via Input/Output (I/O) interfaces 72. Still yet, computer system/server 70 can communicate with one or more networks such as a local area network (LAN), a general wide area network (WAN), and/or a public network (e.g., the Internet) via network adapter 73. As depicted, network adapter 73 communicates with the other components of computer system/server 70 via bus 90. It should be understood that although not shown, other hardware and/or software components could be used in conjunction with computer system/server 70. Examples, include, but are not limited to: microcode, device drivers, redundant processing units, external disk drive arrays, RAID systems, tape drives, and data archival storage systems, etc.

In the context of the present application, where embodiments of the present invention constitute a method, it should be understood that such a method is a process for execution by a computer, i.e. is a computer-implementable method. The various steps of the method therefore reflect various parts of a computer program, e.g. various parts of one or more algorithms.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a storage class memory (SCM), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for reviewing content previously displayed on a display screen, comprising:
monitoring content displayed on a display screen for an occurrence of a trigger event and capturing a screenshot in response to each occurrence of the trigger event;
capturing at least one screenshot of at least part of the display screen in response to the occurrence of the trigger event, wherein the trigger event is based on a change in displayed content;
storing, in association with each captured screenshot, a value of at least one criterion of the displayed content, wherein the criterion of the displayed content comprises the position on the display screen at which the changes in the displayed content occurred;
receiving a request, based on at least one of the stored criteria, to review a captured screenshot, wherein the request to review a captured screenshot is a request to review a selection from a plurality of captured screenshots, the selection being based on the stored values of at least one of the criteria, and wherein the request includes an indication of a first location on the display screen as the selection from a plurality of captured of screenshots for which the position at which changes in displayed content occurred overlaps with the first location; and
overlaying a screenshot corresponding with the request on the display screen.

2. The method of claim 1, wherein:
one of the criteria of the displayed content comprises the time at which the changes in the displayed screen occurred, and
the storing comprises storing, for each captured screenshot, a time at which the changes in the displayed content occurred in association with the captured screenshot and the position on the screen.

3. The method of claim 1, comprising:
receiving an input indicative of a selection of one screenshot from among a plurality of captured screenshots for which the position at which changes occurred overlaps with the selected location on the screen, and
overlaying on the display screen at least the selected one screenshot at the selected location,
wherein the receiving of an input indicative of the location on the screen and of the selection from among plural captured screenshots comprises receiving as a location pointer and as a scrolling position an output from a viewer interface.

4. The method of claim 1, further comprising capturing successive full screens and video processing the captured full screens to identify differences between them, wherein the trigger event is based on the identified differences.

5. The method of claim 1, further comprising receiving an input indicative of one screenshot from among a plurality of selected captured screenshots and overlaying at least the one screenshot on the display screen.

6. The method of claim 1, wherein the criterion of the displayed content comprise at least one of:
a position on the screen at which the changes in the displayed content occurred;
a time at which the changes in the displayed content occurred; and
a parameter related to the displayed content.

7. The method of claim 1, wherein the trigger event is based on pixel changes in the display screen.

8. The method of claim 1, further comprising receiving an input indicative of a threshold level of an amount of change in the displayed screens, and using the received threshold level to determine the occurrence of the trigger event.

9. The method of claim 1, further comprising:
tracking motion of a window as at least part of the displayed screen;
wherein the capturing of a screenshot further comprises capturing screenshots at start and end points of the motion of the window.

10. The method of claim 1, wherein the capturing of a screenshot is of a full screen as displayed, the method further comprising:

receiving an input indicative of a selection of full screen or partial screen display of screenshots;

overlaying on the display screen, in accordance with the selection, the at least one identified screenshot as one of a full screen or a partial screen; and wherein the method further comprises: generating the partial screen from the full screen based on the location on the screen at which changes in the displayed image occurred.

11. The method of claim 1, further comprising OCR processing the requested screenshot to generate text.

12. The method of claim 1, wherein the content displayed on the display screen is obtained from browsing a web in which a sequence of screens are generated and displayed.

13. A computer program product for reviewing content previously displayed on a display screen, the computer program product comprising a computer readable storage medium having program instructions embodied therewith, the program instructions executable by a processing unit to cause the processing unit to perform operations comprising:

monitoring content displayed on a display screen for an occurrence of a trigger event and capturing a screenshot in response to each occurrence of the trigger event;

capturing at least one screenshot of at least part of the display screen in response to the occurrence of the trigger event, wherein the trigger event is based on a change in displayed content;

storing, in association with each captured screenshot, a value of at least one criterion of the displayed content, wherein the criterion of the displayed content comprises the position on the display screen at which the changes in the displayed content occurred;

receiving a request, based on at least one of the stored criteria, to review a captured screenshot, wherein the request to review a captured screenshot is a request to review a selection from a plurality of captured screenshots, the selection being based on the stored values of at least one of the criteria, and wherein the request includes an indication of a first location on the display screen as the selection from a plurality of captured of screenshots for which the position at which changes in displayed content occurred overlaps with the first location; and overlaying a screenshot corresponding with the request on the display screen.

14. A computer system for reviewing content that has been previously displayed on a display screen comprising:

a processor, a memory, and the display screen; and a computer readable storage medium having program instructions executable by the processor to cause operations comprising:

monitoring content displayed on a display screen for an occurrence of a trigger event and capturing a screenshot in response to each occurrence of the trigger event;

capturing at least one screenshot of at least part of the display screen in response to the occurrence of the trigger event, wherein the trigger event is based on a change in displayed content;

storing, in association with each captured screenshot, a value of at least one criterion of the displayed content, wherein the criterion of the displayed content comprises the position on the display screen at which the changes in the displayed content occurred;

receiving through a viewer interface a request, based on at least one of the stored criteria, to review a captured screenshot, wherein the request to review a captured screenshot is a request to review a selection from a plurality of captured screenshots, the selection being based on the stored values of at least one of the criteria, and wherein the request includes an indication of a first location on the display screen as the selection from a plurality of captured of screenshots for which the position at which changes in displayed content occurred overlaps with the first location; and overlaying the requested screenshot corresponding with the request on the display screen.

15. The system of claim 14, wherein the criterion of the displayed content comprises at least one of:

a position on the screen at which the changes in the displayed content occurred;

a time at which the changes in the displayed content occurred; and a parameter related to the displayed content.

16. The system of claim 15, wherein the operations further comprise:

receiving an input indicative of a selection of one screenshot from among a plurality of captured screenshots for which the position at which changes occurred overlaps with the selected location on the screen, and overlaying on the display screen at least the selected one screenshot at the selected location, wherein the receiving of an input indicative of the location on the screen and of the selection from among plural captured screenshots comprises receiving as a location pointer and as a scrolling position an output from a viewer interface.

\* \* \* \* \*